United States Patent Office 3,493,409
Patented Feb. 3, 1970

3,493,409
ASPHALTIC COATING COMPOSITION
Russell E. Koons, St. Louis, Mo., assignor to Monsanto Company, St. Louis, Mo., a corporation of Delaware
No Drawing. Filed Sept. 21, 1965, Ser. No. 489,063
Int. Cl. C09d 3/24; B44d 1/08
U.S. Cl. 106—278                    15 Claims

ABSTRACT OF THE DISCLOSURE

Coating compositions that are useful in electrostatic spray coating processes are made by combining a cutback asphaltic material with an organic and a nitrogen-containing compound such as ammonia or ammonium hydroxide.

The present invention relates to asphalt coating compositions. More particularly, the present invention relates to asphalt coating compositions useful in electrostatic spray coating processes.

Electrostatic spray coating is well known in industry as a highly useful and efficient method for applying protective and ornamental coatings to articles. In electrostatic spray coating, the coating composition is generally particleized and electrically charged into minute droplets of the coating each having an electric charge. The article to be coated is either passed between the coating source and an oppositely electrically charged grid or the article to be coated is itself oppositely charged. Once the electrically charged droplet of coating material enters the electrostatic field of the grid or charged article it is attracted to it, thus causing deposition of the coating material on the article to be coated. The primary advantages of electrostatic coating is, of course, a significant reduction in the amount of paint or coating material required, more uniform dispersion of the coating material and a reduction in the amount of coating material dispersed in the air outside the immediate coating area.

Asphalts and asphaltic pitches, both petroleum and coal tar derived, are useful in many instances as coating compositions. However, in their naturally obtained state, the asphalts, asphaltic pitches as well as hydrocarbon solutions of these materials, are relatively resistant to the flow of electricity and are therefore difficult to electrically charge. Of course, much of the advantage obtained through electrostatic spray coating means is lost if the coating material cannot be readily electrically charged. For this reason, asphalts and pitches have not been used as coating materials in electrostatic spray coating systems to an extent commensurate with their usefulness as coating materials. To realize the most use from these materials as coating compositions requires a means for reducing the electrical resistivity of the asphalt, asphaltic pitch or hydrocarbon solutions of these without at the same time destroying the usefulness as a coating composition.

The use of cutback solvents having low electrical resistance in admixture with or as substitutes for the usual hydrocarbon cutback solvents is a means by which lower electrical resistance in asphaltic compositions may be obtained. An example of a solvent having such lower resistance is methylethyl ketone. However, relatively large amounts of such solvents of lower electrical resistivity are necessary to lower the electrical resistivity of the asphaltic coating compositions sufficient for electrostatic coating use and such solvents are generally relatively expensive.

It is an object of the present invention to provide new and useful asphalt and asphaltic pitch-containing coating compositions. Another object of the present invention is to provide novel asphalt and asphaltic pitch-containing compositions particularly useful in electrostatic spray coating processes. It is also an object of the present invention to provide a method for reducing the electrical resistivity of asphalt and asphaltic pitch-containing coating materials without destroying their usefulness as coatings. Another object of the present invention is to provide new and useful asphalt and asphaltic pitch-coating compositions having low electrical resistance. Yet another object of the present invention is to provide an improved process for electrostatic spray coating. Other objects will become apparent from the following description of the invention herein disclosed.

The present invention which fulfills these and other objects, in one of its embodiments, is a coating composition comprised of a cutback asphaltic material selected from the group consisting of asphalts and asphaltic pitches to which has been added an acid and a nitrogen containing compound, said acid selected from the group consisting of aliphatic and aromatic acids and said nitrogen-containing compound selected from the group consisting of ammonia, ammonium hydroxide, primary amines and secondary amines.

In another embodiment, the present invention is a method for reducing the electrical resistance of asphaltic coating materials which comprises adding to said asphaltic coating material an acid and a nitrogen-containing compound, said acid selected from the group consisting of aliphatic and aromatic acids and said nitrogen-containing compound being selected from the group consisting of ammonia, ammonium hydroxide, primary amines and secondary amines.

In yet another embodiment, the present invention is a process for electrostatic spray coating which comprises imparting an electrical charge to a coating composition comprised of a cutback asphaltic material selected from the group consisting of asphalts and asphaltic pitches, an acid selected from the group consisting of aliphatic and aromatic acids, and a nitrogen-containing compound selected from the group consisting of ammonia, ammonium hydroxide, primary amines and secondary amines, introducing the electrically charged coating composition in atomized form into an electrostatic field obtained by oppositely electrically charging the article to be coated, thereby causing a deposition of said coating material on said article to be coated.

The present invention provides a means whereby coating compositions comprised of cutback asphalts and/or asphaltic pitches may be readily used in electrostatic spray coating operations. An additional benefit of the present invention resides in the fact that low cost hydrocarbonaceous cutback solvents may be used in the coating compositions.

In order to further describe, as well as to illustrate the present invention, the following examples are presented. These examples are in no manner to be construed as limiting the present invention.

EXAMPLE I

An asphalt coating composition was prepared from an asphalt obtained from a Smackover crude oil from Smackover Field, Ark. This asphalt had a softening of 179° F. (R&B) and a penetration at 77° F., 100 g., 5 sec. of 12 mm./10. This asphalt was dissolved in an amount of 240 to 315° F. boiling range naphtha sufficient to produce a naphtha concentration in the resulting cutback asphalt of 53 weight percent. This cutback asphalt had an electrical resistance of 300 megohms. Approximately 5.4 percent by weight of a mixture consisting of 77.7 percent by weight of distilled tall oil (containing 56% by weight fatty acids), 9.3 percent by weight of n-butylamine, 13.1 percent by weight of water was added to the cutback asphalt with constant stirring while the temperature was raised from approximately 60° F. to about 130° F. The electrical resistance of this final composition was 25 megohms.

EXAMPLE II

A cutback asphalt was prepared from the asphalt and naphtha of Example I, but with the naphtha being only 49.3% by weight of the cutback asphalt. The electrical resistance of this cutback asphalt was about 300 megohms. To this cutback was added approximately 5.4% by weight of a mixture consisting of 98.6% by weight of distilled tall oil, 0.5% by weight of ammonia and 1.4% by weight of water. The conditions under which this mixture was added were the same as those in Example I. On testing the resulting coating composition, it was found to have an electrical resistance of 12 megohms.

The method of reducing electrical resistivity in coating compositions as disclosed and claimed herein is useful in lowering the electrical resistance of virtually all cutback asphalts and asphalt pitches suitable as coating compositions. The asphalts include residual asphalts, air-blown asphalts and solvent-extracted asphalts. Asphaltic pitches include those asphalt-like residuums resulting from the thermal or catalytic cracking of petroleum or coal-tar derived fractions or from the distillation of crude oils and coal-tar oils. The present method of reducing electrical resistivity is particularly useful in rendering cutback asphalts suitable for use in electrostatic spray coating systems by producing a substantial decrease in the electrical resistivity of such materials. Cutback, asphalts, as used herein, include those asphalts or asphaltic pitches which have been admixed with a solvent of lower boiling point or range than the asphalt or pitch and have thereby been rendered less viscous and more fluid.

The asphaltic coating compositions preferred in the electrostatic spray coating composition of the present invention are cutback asphalts comprised of 25 to 70% by weight of the asphalt and 30 to 75% by weight of the cutback solvent. Preferably, the cutback asphalts are comprised of 40 to 65% by weight of the asphalt and 35 to 60% by weight of the cutback solvent. The asphalts are usually those having softening points within the range of 150 to 225° F. (ASTM-D-36-26) and penetrations at 77° F. of 3 to 40 mm./10 (ASTM-D-5-59T). Preferred asphalts are those having softening points within the range of 170 to 210° F. (ASTM-D-36-26) and penetrations at 77° F. of 5 to 20 mm./10 (ASTM-D-5-59T).

Cutback vehicles most useful in the compositions of the present invention include the well known hydrocarbon asphalt solvents. Among such solvents are the solvent naphthas which are particularly useful. Preferred cutback vehicles are the solvent naphthas boiling principally within the range of 150 to 400° F., preferably 200 to 360° F. Of course, non-hydrocarbon solvents such as methylethyl ketone may be used if desired. However, since one of the advantages derived from the present invention is that it permits the use of the more inexpensive hydrocarbon solvents, seldom will the more expensive non-hydrocarbon solvents be used.

Acids useful in the electrostatic spray coating compositions of the present invention include both aliphatic and aromatic acids. The aliphatic acids, as used in the present invention, include both the alicyclic and acyclic acids. Non-limiting examples of the aliphatic acids are such compounds as methanoic acid, ethanoic acid, propanoic acid, butanoic acid, 2-methylpropanoic acid, pentanoic acid, 3-methylbutanoic acid, 2-methylbutanoic acid, 2,2-dimethylpropanoic acid, hexanoic acids, heptanoic acids, octanoic acids, nonoic acids, decanoic acids, hendecanoic acids, dodecanoic acids, tridecanoic acids, tetradecanoic acids, pentadecanoic acids, hexadecanoic acids, heptadecanoic acids, octadecanoic acids, eicosanoic acids, acrylic acid, oleic acid, elaidic acid, azelaic acid, mesaconic acid, citraconic acid, linoleic acid, ricinoleic acid, octadecadienoic acid, hydnocarpic acids, chaulmoogric acids, crotonic acid, isocrotonic acids, glutaric acid, succinic acid, cyclohexanemonocarboxylic acid, cyclopentanemonocarboxylic acid, and the like, as well as mixtures of these acids. The aromatic acids include such compounds as benzoic acid, salicyclic acid, protocatechuic acid, toluic acids, xylic acids, gallic acid, mandelic acid, phenyl acetic acid, phenylpropionic acids, cinnamic acid, allocinnamic acid, tropic acid, atropic acid, and the like. Also included in the aromatic acids are such resin acids as pimaric, sapinic, colophonic, sylvic acids and the like. A preferred group of acids are the unsaturated aliphatic acids of 6 to 30 carbon atoms per molecule such as oleic acid, elaidic acid, linoleic, linolic acid and the fatty acids in general. Another very useful group of acids are the naphthenic acids of 6 to 20 carbon atoms per molecule. A particularly useful source of preferred acids is tall oil which contains substantial quantities of the unsaturated fatty acids along with resin acids.

The amount of acid used in preparing the electrostatic spray coating compositions of the present invention is usually within the range of 0.1 to 10.0% by weight of the total composition. Preferred electrostatic spray coating compositions prepared in accordance with the present invention are those to which has been added 0.5 to 6.0% by weight of one of the acids described above.

The nitrogen-containing compounds useful in the electrostatic spray coating compositions of the present invention are such compounds as ammonia, ammonium hydroxide, primary amines and secondary amines. The amines include both aliphatic and aromatic amines. Non-limiting examples of the primary and secondary amines suitable for the present compositions are such compounds as methylamine, dimethylamine, ethylamine, dimethylethylamine, diethylamine, n-propylamine, isopropylamine, n-butylamine, sec-butylamine, isobutylamines, n-amylamine, isoamylamines, n-hexylamines isohexylamines, ethylene diamine, tetramethylene diamine, aniline, methylaniline, benzylamine, phenylethylamines, diaminobenzenes, and other such compounds. The preferred primary and secondary amines are those having hydrocarbon radicals of no greater than 7 carbon atoms as substituents to the nitrogen. Especially useful amines are such aliphatic amines as n-butylamines, isobutylamine, ethylamine, diethylamine, propylamine, dipropylamine, and the like. The preferred electrostatic spray coating compositions of the present invention are those to which has been added a nitrogen-containing compound selected from the group consisting of ammonia and ammonium hydroxide with the latter being preferred over the former.

Usually, the amount of nitrogen-containing compound added to the electrostatic spray coating compositions of the present invention is equivalent to 0.005 to 10% by weight of the total resulting compositions. A preferred amount is that which is equivalent to 0.01 to 3% by weight of the total composition.

In preparing the electrostatic spray coating compositions of the present invention, it is usually preferred that a small amount of water be added to the composition unless the nitrogen-containing compound is ammonium hydroxide. The amount of water used will seldom be more than 2.0% by weight or less than 0.01% by weight of the total composition. A preferred amount of water is within the range of 0.05 to 0.5% by weight of the total composition.

Addition of the acid and the nitrogen-containing compound to the asphalt is believed to result in the in situ formation of an ammonium salt of the acid. However, the present invention is not to be so limited. It is, however, within the scope of the present invention that ammonium salts resulting from reaction of the above-described acids and nitrogen-containing compounds may be used in place of or in conjunction with these acids and nitrogen-containing compounds. If the ammonium salt is used instead of the acid and amine, it will usually be added in an amount equivalent to that which would be formed by reactions of the above limited amounts of acid and nitrogen-containing compound.

The acid and nitrogen-containing compound and water, if any, are mixed with the cutback asphalt coating material at temperatures sufficiently high to allow intimate and thorough dispersion of the acid and nitrogen-containing compound through the asphalt coating material. Such temperatures may range from ambient temperatures (60–90° F.) to 200° F. or higher. In many instances, the mixing temperature is relatively critical since it must be sufficient to allow adequate mixing, but must be maintained below the decomposition temperature of the additive materials. Ammonium hydroxide as well as many of the ammonium salts and amines and acids are not stable in the presence of temperatures in excess of 120°–150° F. When the asphalt coating material is such that it cannot be softened sufficiently for adequate mixing at temperatures below the decomposition temperatures of the additives, it is often necessary to add additional solvent to that already present to lower the softening point of the asphalt coating material.

The electrostatic spray coating compositions of the present invention will generally have an electrical resistance of less than 80 megohms. Preferably, these compositions have an electrical resistance of less than 40 megohms.

In the electrostatic spray process of the present invention, an electrical charge is imparted to the above-defined electrostatic spray coating composition. The electrical charge is imparted to the coating composition before, after or concurrently with atomization of the coating composition. Means for atomizing and electrically charging the coating compositions are well known to the art and any of these means may be used in the present process. In the preferred manner of carrying out the electrostatic spray coating process, the article to be coated is electrically charged with an opposite electrical charge to that of the coating composition and is so positioned that the atomized coating composition will find its way into the electrostatic field surrounding the article to be coated. The electrically charged particles of coating material, on entering the electrical field of the article to be coated are deposited upon the surface of the article to be coated in an even and uniform manner. If the article to be coated is not a conducting medium and thus itself cannot be electrically charged, it can be treated with an electrically conductive material which in most instances will then make it possible to coat the article by electrostatic spray coating means. An alternative, but less efficient method of electrostatically spray coating, comprises charging a grid rather than the article to be coated with an opposite electrical charge to that of the spray coating composition and then passing the article to be coated between the charged grid and the source of the atomized coating composition.

To demonstrate the coating composition of the present invention in an electrostatic spray process, a coating composition such as described in Example II above was used as the coating material in an electrostatic spray coating system. The coating composition was found to deposit evenly and smoothly over a steel test plate with no evidence of overspray, sags or drips.

What is claimed is:
1. A coating composition comprised of a cutback asphaltic material selected from the group consisting of asphalts and asphaltic pitches to which has been added 0.1 to 10% by weight of an acid and .005 to 10% by weight of a nitrogen-containing compound, said acid selected from the group consisting of unsaturated aliphatic acids containing from 6 to 30 carbon atoms per molecule and naphthenic acids containing 6 to 20 carbon atoms per molecule and said nitrogen-containing compound selected from the group consisting of ammonia or ammonium hydroxide.

2. The composition of claim 1 wherein the cutback asphaltic material is comprised of 25 to 70% by weight of asphalt and 30 to 75% by weight of the cutback solvent.

3. The composition of claim 2 wherein the asphalt is one having a softening point within the range of 150 to 225° F. (ASTM–D–36–26) and a penetration at 77° F. of 3 to 40 mm./10 (ASTM–D–5–59T).

4. The composition of claim 2 wherein the cutback solvent is a solvent naphtha.

5. The composition of claim 1 wherein the acid is tall oil.

6. The composition of claim 1 wherein the amount of acid present in the composition is within the range of .5 to 6% by weight of the total composition.

7. The composition of claim 1 wherein the amount of nitrogen-containing compound is equivalent to .01 to 3% by weight of the total composition.

8. The composition of claim 1 wherein approximately 0.01 to 2.0% by weight of water is included in the composition.

9. The composition of claim 1 wherein the acid and nitrogen-containing compound are added to the composition as an ammonium salt.

10. A method for reducing the electrical resistance of asphaltic coating materials which comprises adding to said asphaltic material 0.1 to 10% by weight of an acid and .005 to 10% by weight of a nitrogen-containing compound, said acid selected from the group consisting of unsaturated aliphatic acids containing from 6 to 30 carbon atoms per molecule and naphthenic acids containing from 6 to 20 carbon atoms per molecule and said nitrogen-containing compound being selected from the group consisting of ammonia and ammonium hydroxide.

11. The method of claim 10 wherein the asphaltic coating is one comprised of 25 to 70% by weight of asphalt and 30 to 75% by weight of the cutback solvent.

12. The method of claim 11 wherein the asphalt is one having a softening point within the range of 150 to 225° F. (ASTM–D–36–26) and a penetration at 77° F. of 3 to 40 mm./10 (ASTM–D–5–59T).

13. The method of claim 10 wherein the acid is added as tall oil.

14. The method of claim 10 wherein approximately 0.01 to 2.0% by weight of water is added.

15. A process for electrostatic spray coating which comprises imparting an electrical charge to a coating composition comprised of a cutback asphaltic material selected from the group consisting of asphalts and asphaltic pitches, 0.1 to 10% by weight of an acid selected from the group consisting of unsaturated aliphatic acids containing from 6 to 30 carbon atoms per molecule and naphthenic acids containing from 6 to 20 carbon atoms per molecule, and .005 to 10% by weight of a nitrogen-containing compound selected from the group consisting of ammonia and ammonium hydroxide, introducing the electrically charged coating composition in atomized form into an electrostatic field obtained by oppositely electrically charging the article to be coated, thereby causing a deposition of said coating material on said article to be coated.

References Cited

UNITED STATES PATENTS

| 2,785,078 | 3/1957 | Keating et al. | 106—278 XR |
| 2,461,971 | 2/1949 | Fischer | 106—273 XR |
| 2,728,682 | 12/1955 | Kalinowski et al. | 106—273 XR |
| 3,028,249 | 4/1962 | Hoiberg | 106—273 |
| 3,098,094 | 7/1963 | Pitchford | 106—273 XR |

JULIUS FROME, Primary Examiner

J. B. EVANS, Assistant Examiner

U.S. Cl. X.R.

106—14, 279; 117—135, 168, 93.42; 148—6; 208—22,44